(12) United States Patent
Meyer et al.

(10) Patent No.: US 7,981,211 B2
(45) Date of Patent: Jul. 19, 2011

(54) SURFACE-MODIFIED SILICAS

(75) Inventors: Juergen Meyer, Stockstadt (DE); Mario Scholz, Gruendau (DE)

(73) Assignee: Evonik Degussa GmbH, Essen (DE)

( * ) Notice: Subject to any disclaimer, the term of this patent is extended or adjusted under 35 U.S.C. 154(b) by 96 days.

(21) Appl. No.: 12/442,611

(22) PCT Filed: Sep. 11, 2007

(86) PCT No.: PCT/EP2007/059528
§ 371 (c)(1),
(2), (4) Date: Mar. 24, 2009

(87) PCT Pub. No.: WO2008/043633
PCT Pub. Date: Apr. 17, 2008

(65) Prior Publication Data
US 2009/0258968 A1 Oct. 15, 2009

(30) Foreign Application Priority Data
Oct. 13, 2006 (DE) .......................... 10 2006 048 575

(51) Int. Cl.
*C04B 14/04* (2006.01)
(52) U.S. Cl. ........ 106/490; 106/482; 524/493; 523/209; 523/216; 423/332; 423/337

(58) Field of Classification Search .................. 524/492, 524/493; 523/209, 216; 106/482, 490; 423/332, 423/337
See application file for complete search history.

(56) References Cited

U.S. PATENT DOCUMENTS

| | | | |
|---|---|---|---|
| 2002/0168524 A1 | 11/2002 | Kerner et al. | |
| 2005/0215668 A1* | 9/2005 | Scholz et al. | 523/216 |
| 2005/0215696 A1 | 9/2005 | Scholz et al. | |
| 2009/0076194 A1* | 3/2009 | Meyer et al. | 523/209 |

FOREIGN PATENT DOCUMENTS

| | | |
|---|---|---|
| DE | 102 42 798 | 4/2004 |
| EP | 1 236 773 | 9/2002 |
| WO | 2006 053632 | 5/2006 |

* cited by examiner

*Primary Examiner* — David Wu
*Assistant Examiner* — Vu A Nguyen
(74) *Attorney, Agent, or Firm* — Oblon, Spivak, McClelland, Maier & Neustadt, L.L.P.

(57) ABSTRACT

Surface-modified, fumed silica having the data: BET surface area, $m^2/g$: 25-400; Average primary particle size, nm: 5-50; pH: 3-10; Carbon content, % by weight: 0.1-10; Potassium content (calculated as potassium oxide), % by weight: 0.000001-40; is prepared by subjecting a fumed silica to surface modification in the presence of potassium compounds. It can be used in LSR silicone rubber compositions as a filler.

5 Claims, No Drawings

SURFACE-MODIFIED SILICAS

The invention relates to surface-modified silicas, to a process for preparing them and to their use as fillers in silicone rubber compositions.

The preparation of LSR silicone rubber compositions comprising a fumed silica filler doped with potassium by means of aerosol is known (WO 2004/033544 A1).

These known LSR silicone rubber compositions, disadvantageously, do not have the desired quality in respect of transparency.

The object was therefore to develop a filler for silicone rubber compositions that prevents these disadvantages.

The invention provides surface-modified, fumed silicas which are characterized in that they have the following characteristic physicochemical data:

| | |
|---|---|
| BET surface area, $m^2/g$: | 25-400 |
| Average primary particle size, nm: | 5-50 |
| pH: | 3-10 |
| Carbon content, % by weight: | 0.1-10 |
| Potassium content (calculated as potassium oxide), % by weight: | 0.000001-40 |

The surface-modified, fumed silicas of the invention can be prepared in that a fumed silica is surface-modified in a known manner and a solution with a potassium compound dissolved therein is added before and/or during the surface modification reaction.

The surface modification can be accomplished by spraying the silicas, where appropriate, first with a solution with a potassium compound dissolved therein, then, where appropriate, with water and then with the surface modifier. Spraying may also take place in the opposite order or even simultaneously. The water used may have been acidified with an acid, hydrochloric acid, for example, to a pH of 7 to 1. If two or more surface modifiers are employed, they can be applied together, or separately, in succession or as a mixture.

The surface modifier or modifiers may have been dissolved in suitable solvents. The solution of the surface modifier with a potassium compound dissolved therein can also be used. The end of spraying may be followed by mixing for 5 to 30 minutes more.

The mixture is subsequently treated thermally at a temperature of 20 to 400° C. over a period of 0.1 to 6 h. The thermal treatment may take place under inert gas, such as nitrogen, for example.

An alternative method of surface modification of the silicas can be accomplished by mixing the silicas, where appropriate, first with a solution with a potassium compound dissolved therein and then or at the same time with the surface modifier in vapour form and then thermally treating the mixture at a temperature of 50 to 80° C. over a period of 0.1 to 6 h. The thermal treatment may take place under inert gas, such as nitrogen, for example.

The temperature treatment may also take place over a number of stages at different temperatures.

The surface modifier or modifiers can be applied using single-fluid, two-fluid or ultrasound nozzles.

The surface modification can be carried out in heatable mixers and dryers with spraying installations, continuously or batchwise. Suitable apparatus may for example be the following: ploughshare mixers, plate dryers, fluidized-bed dryers or fluid-bed dryers.

Fumed silicas or silicon dioxides are oxides of silicon that have been prepared by means of flame hydrolysis or high-temperature hydrolysis.

This process is known from Ullmann's Encyklopädie der technischen Chemie, 4th edition, volume 21, pages 464 ff. It involves subjecting, for example, silicon tetrachloride vapour, hydrogen and air to combustion in a cooled combustion chamber.

The oxyhydrogen gas flame supplies not only the energy but also the quantity of water needed for the hydrolysis of the silicon tetrachloride. Instead of silicon tetrachloride it is possible to use other vaporizable silicon compounds.

As fumed silicon dioxides it is possible in particular to use the silicon dioxides which are set out in Table 1.

TABLE 1

| | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| CAS reg. number | 112945-52-5 (old No.: 7631-86-9) | | | | | | | |
| Attitude to water | hydrophilic | | | | | | | |
| Appearance | loose white powder | | | | | | | |
| BET surface area[1] $m^2/g$ | 200 ± 50 | 90 ± 15 | 130 ± 25 | 150 ± 15 | 200 ± 25 | 300 ± 30 | 380 ± 30 | 50 ± 15 |
| Average primary particle size nm | 40 | 20 | 16 | 14 | 12 | 7 | 7 | 40 |
| Tapped density[2] standard product g/l | about 60 | about 80 | about 50 | about 50 | about 50 | about 50 | about 50 | about 130 |
| compacted product g/l (addition of "C") | — | — | about 120 | about 120 | about 120 | about 120 | about 120 | — |
| Loss on drying[3] (2 h at 105° C.) % on leaving the supply plant | <2.5 | <1.0 | <1.5 | <0.5[9] | <1.5 | <1.5 | <2.0 | <1.5 |
| Loss on ignition[4,7] (2 h at 1000° C.) % | <2.5 | <1 | <1 | <1 | <1 | <2 | <2.5 | <1 |

TABLE 1-continued

| | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| pH[5] (in 4% aqueous dispersion) | 3.6-4.5 | 3.7-4.7 | 3.7-4.7 | 3.7-4.7 | 3.7-4.7 | 3.7-4.7 | 3.7-4.7 | 3.6-4.3 |
| $SiO_2$[8] % | >99.8 | >99.8 | >99.8 | >99.8 | >99.8 | >99.8 | >99.8 | >99.8 |
| $Al_2O_3$[8] % | <0.05 | <0.05 | <0.05 | <0.05 | <0.05 | <0.05 | <0.05 | <0.08 |
| $Fe_2O_3$[8] % | <0.003 | <0.003 | <0.003 | <0.003 | <0.003 | <0.003 | <0.003 | <0.01 |
| $TiO_2$[8] % | <0.03 | <0.03 | <0.03 | <0.03 | <0.03 | <0.03 | <0.03 | <0.03 |
| HCl[8] [10] % | <0.025 | <0.025 | <0.025 | <0.025 | <0.025 | <0.025 | <0.025 | <0.025 |
| Sieve residue[6] (Mocker method, 45 μm) % | <0.05 | <0.05 | <0.05 | <0.05 | <0.05 | <0.05 | <0.05 | <0.2 |

[1] based on DIN 66131
[2] based on DIN ISO 787/XI, JIS K 5101/18 (unsieved)
[3] based on DIN ISO 787/II, ASTM D 280, JIS K 5101/21
[4] based on DIN 55921, ASTM D 1208, JIS K 5101/23
[5] based on DIN ISO 787/IX, ASTM D 1208, JIS K 5101/24
[6] based on DIN ISO 787/XVIII, JIS K 5101/20
[7] based on the substance dried at 105° C. for 2 hours
[8] based on the substance calcined at 1000° C. for 2 hours
[9] special moistureproof packaging
[10] HCl content in constituent from loss on ignition Surface modifiers which can be used are at least one compound from the group of the following compounds.

a) organosilanes of type $(RO)_3Si(C_nH_{2n+1})$ and $(RO)_3Si(C_nH_{2n-1})$
   R=alkyl, such as methyl-, ethyl-, n-propyl-, isopropyl-, butyl-
   n=1-20 b) organosilanes of type $R'_x(RO)_ySi(C_nH_{2n+1})$ and $R'_x(RO)_ySi(C_nH_{2n-1})$
   R=alkyl, such as methyl-, ethyl-, n-propyl-, isopropyl-, butyl-
   R'=alkyl, such as methyl-, ethyl-, n-propyl-, isopropyl-, butyl-
   R'=cycloalkyl
   n=1-20
   x+y=3
   x=1, 2
   y=1, 2 c) haloorganosilanes of type $X_3Si(C_nH_{2n+1})$ and $X_3Si(C_nH_{2n-1})$
   X=Cl, Br
   n=1-20 d) haloorganosilanes of type $X_2(R')Si(C_nH_{2n+1})$ and $X_2(R')Si(C_nH_{2n-1})$
   X=Cl, Br
   R'=alkyl, such as methyl-, ethyl-, n-propyl-, isopropyl-, butyl-
   R'=cycloalkyl
   n=1-20 e) haloorganosilanes of type $X(R')_2Si(C_nH_{2n+1})$ and $X(R')_2Si(C_nH_{2n-1})$
   X=Cl, Br
   R'=alkyl, such as methyl-, ethyl-, n-propyl-, isopropyl-, butyl-
   R'=cycloalkyl
   n=1-20 f) organosilanes of type $(RO)_3Si(CH_2)_m—R'$
   R=alkyl, such as methyl-, ethyl-, propyl-
   m=0.1-20
   R'=methyl-, aryl (for example —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—$(CH_2$—$CH_2$—$NH_2)_2$
   —$OOC(CH_3)C$=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si$(OR)_3$
   —$S_x$—$(CH_2)_3$Si$(OR)_3$
   —SH
   —NR'R"R'"(R'=alkyl, aryl; R"=H, alkyl, aryl; R'"=H, alkyl, aryl, benzyl, $C_2H_4$NR""R""' with R""=H, alkyl and R""'=H, alkyl)

g) organosilanes of type $(R")_x(RO)_ySi(CH_2)_m—R'$
   R"=alkyl x+y=3
   =cycloalkyl x=1, 2
   y=1, 2
   m=0.1 to 20
   R'=methyl-, aryl (for example —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—$(CH_2$—$CH_2$—$NH_2)_2$
   —$OOC(CH_3)C$=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si$(OR)_3$
   —$S_x$—$(CH_2)_3$Si$(OR)_3$
   —SH
   —NR'R"R'"(R'=alkyl, aryl; R"=H, alkyl, aryl; R'"=H, alkyl, aryl, benzyl, $C_2H_4$NR""R""' with R""=H, alkyl and R""'=H, alkyl)

h) haloorganosilanes of type $X_3Si(CH_2)_m—R'$
   X=Cl, Br
   m=0.1-20
   R'=methyl-, aryl (for example —$C_6H_5$, substituted phenyl radicals)

—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$,
—NH—CH$_2$—CH$_2$—NH$_2$
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH i) haloorganosilanes of type (R)X$_2$Si(CH$_2$)$_m$—R'
X=Cl, Br
R=alkyl, such as methyl-, ethyl-, propyl-
m=0.1-20
R=methyl-, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$, it being possible for R to be methyl-, ethyl-, propyl-, butyl-
—S$_x$—(CH$_2$)$_3$Si(OR)$_3$, it being possible for R to be methyl-, ethyl-, propyl-, butyl-
—SH j) haloorganosilanes of type (R)$_2$XSi(CH$_2$)$_m$—R'
X=Cl, Br
R=alkyl
m=0.1-20
R'=methyl-, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$—NH$_2$, —N$_3$, —SCN, —CH=CH$_2$, —NH—CH$_2$—CH$_2$—NH$_2$, —N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si (OR)$_3$
—SH k) silazanes of type

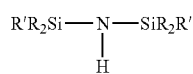

R=alkyl, vinyl, aryl
R'=alkyl, vinyl, aryl l) cyclic polysiloxanes of type D 3, D 4, D 5, with D 3, D 4 and D 5 meaning cyclic polysiloxanes having 3, 4 or 5 units of type —O—Si(CH$_3$)$_2$—.
e.g. octamethylcyclotetrasiloxane=D 4

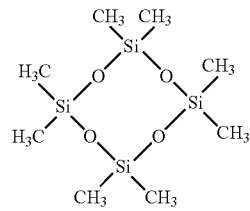

m) polysiloxanes or silicone oils of type

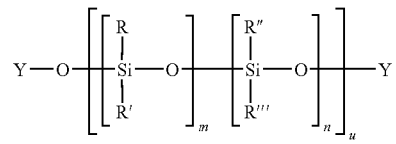

m = 0, 1, 2, 3, ... ∞
n = 0, 1, 2, 3, ... ∞
u = 0, 1, 2, 3, ... ∞
Y = CH$_3$, H, C$_n$H$_{2n+1}$
  n = 1 - 20
Y = Si(CH$_3$)$_3$, Si(CH$_3$)$_2$H
  Si(CH$_3$)$_2$OH, Si(CH$_3$)$_2$(OCH$_3$)
  Si(CH$_3$)$_2$(C$_n$H$_{2n+1}$)
  n = 1 - 20

R=alkyl such as C$_n$H$_{2n+1}$, n being 1 to 20, aryl such as phenyl radicals and substituted phenyl radicals, (CH$_2$)$_n$—NH$_2$, H R'=alkyl such as C$_n$H$_{2n+1}$, n being 1 to 20, aryl such as phenyl radicals and substituted phenyl radicals, (CH$_2$)$_n$—NH$_2$, H R"=alkyl such as C$_n$H$_{2n+1}$, n being 1 to 20, aryl such as phenyl radicals and substituted phenyl radicals, (CH$_2$)$_n$—NH$_2$, H R'"=alkyl such as C$_n$H$_{2n+1}$, n being 1 to 20, aryl such as phenyl radicals and substituted phenyl radicals, (CH$_2$)$_n$—NH$_2$, H As surface modifiers it is preferred to use the following silanes:

octyltrimethoxysilane, octyltriethoxysilane, hexamethyldisilazane, 3-methacryloyloxypropyltrimethoxysilane, 3-methacryloyloxypropyltriethoxysilane, hexadecyltrimethoxysilane, hexadecyltriethoxysilane, dimethylpolysiloxane, glycidyloxypropyltrimethoxysilane, glycidyloxypropyltriethoxysilane, nonafluorohexyltrimethoxysilane, tridecafluorooctyltrimethoxysilane, tridecafluorooctyltriethoxysilane, aminopropyltriethoxysilane, hexamethyldisilazane.

With particular preference it is possible to use hexamethyldisilazane, dimethylpolysiloxane, octyltrimethoxysilane and/or octyltriethoxysilane.

Potassium compounds which can be used are all potassium compounds, preference being given to potassium chloride, potassium bromide, potassium hydroxide, potassium acetate, potassium adipate, potassium benzoate, potassium carbonate, potassium citrate, potassium formate, potassium fumarate, potassium gluconate, potassium lactate, potassium malate, potassium nitrate, potassium oxalate, potassium propionate, potassium succinate, potassium sulphate, potassium tartrate, potassium hydrogen tartrate, potassium glycerophosphate, potassium hydrogen aspartate, and particular preference to potassium chloride and potassium hydroxide.

The potassium compound can be used in the form of an aqueous solution. The solutions may be highly dilute through to concentrated to saturation point. With preference it is possible to use solutions with a strength of 0.01% to 10%, with particularly preferably 0.1% to 2%.

The invention further provides an LSR silicone rubber composition which is characterized in that it comprises the surface-modified silicas having the following characteristic physicochemical data:

| | |
|---|---|
| BET surface area, m$^2$/g: | 25-400 |
| Average primary particle size, nm: | 5-50 |
| pH: | 3-10 |
| Carbon content, % by weight: | 0.1-10 |
| Potassium content (calculated as potassium oxide), % by weight: | 0.000001-40 |

Where the silica of the invention is incorporated into silicone rubber, the silicone rubber acquires completely innovative properties.

The hydrophobicization also allows the incorporation of fumed silicon dioxides of high surface area in large quantity, in conjunction, surprisingly, with the possibility of achieving excellent rheological properties and, moreover, of an unexpectedly high transparency of the vulcanizates.

For elastomer applications, polydimethylsiloxanes are employed that have molecular weights of between 400 000 and 600 000, which are prepared with addition of regulators such as hexamethyl- or divinyltetramethyldisiloxane and which carry corresponding end groups. To improve the vulcanization behaviour and also the tear propagation resistance, vinylmethyldichlorosilane is often added to the reaction mixture in order to build small amounts (<1%) of vinyl groups into the main chain as substituents (VMQ).

Further constituents which can be used in the silicone rubber are crosslinkers, fillers, catalysts, colour pigments, non-stick agents, plasticizers and adhesion promoters.

Fillers divide up into reinforcing and non-reinforcing fillers.

Non-reinforcing fillers are characterized by extremely weak interactions with the silicone polymer. They include chalk, fine quartz powder, diatomaceous earth, mica, kaolin, Al(OH)$_3$ and Fe$_2$O$_3$. The particle diameters are of the order of magnitude of 0.1 μm. Their functions are to raise the viscosity of the compounds in the non-vulcanized state and to increase the Shore hardness and elasticity modulus of the vulcanized rubbers. In the case of surface-treated fillers, improvements in the tear strength can also be achieved.

Reinforcing fillers are primarily highly disperse silicas with a surface area of >125 m$^2$/g. The reinforcing action is attributable to bonding between filler and silicone polymer. Such bonds are formed between the silanol groups at the surface of the silicas (3-4.5 SiOH groups/nm$^2$) and the silanol groups of the α,ω-dihydroxypolydimethylsiloxanes via hydrogen bonds to the oxygen of the siloxane chain. The consequence of these filler-polymer interactions are increases in viscosity and changes in the glass transition temperature and in the crystallization behaviour. On the other hand, polymer-filler bonds bring about an improvement in the mechanical properties, but may also result in premature crepe hardening of the rubbers.

A position midway between reinforcing and non-reinforcing fillers is occupied by talc. In addition, fillers are utilized for particular effects. They include iron oxide, zirconium oxide or barium zirconate for increasing the heat stability.

Further constituents of silicone rubbers may include catalysts, crosslinking agents, colour pigments, non-stick agents, plasticizers and adhesion promoters.

Plasticizers are required in particular in order to set a low elasticity modulus. Internal adhesion promoters are based on functional silanes which are able to interact on the one hand with the substrate and on the other hand with the crosslinking silicone polymer (principal use in RTV-1 rubbers).

Premature crepe hardening is countered by low molecular mass or monomeric, silanol-rich compounds (e.g. diphenylsilanediol, H$_2$O). They prevent excessive interaction between the silicone polymers and the silanol groups of the filler, by reacting more rapidly with the filler. A corresponding effect can also be achieved by partially covering the filler with trimethylsilyl groups (treatment of filler with methylsilanes).

A further possibility is to modify the siloxane polymer chemically (phenyl polymers, boron-containing polymers) or to blend it with organic polymers (butadiene-styrene copolymers).

Liquid silicone rubber (LSR) is virtually identical to HTV silicone rubber in its molecular structure, HTV silicone rubber having a viscosity of 15 to 30 kPas at a chain length of approx. 10 000 SiO units. However, in terms of average molecular chain length it is situated lower by a factor of 6, which means that its viscosity is lower by a factor of 1000 (20-40 Pas). At the disposal of the processor are two components (A and B) in equal amounts, which already include the fillers, vulcanizing agents and, where appropriate, other additives.

Fillers used are the same silicas and additives as in HTV mixtures. The low viscosity of the initial polymer necessitates particularly intense incorporation and mixing, in specially developed mixing assemblies, in order to obtain homogeneous distribution. To facilitate the incorporation of the filler and in order to avoid crepe hardening, the silica is rendered fully hydrophobic-mostly in situ during the mixing operation and by means of hexamethyldisilazane (HMDS, alternatively HMDZ).

The vulcanization of LSR mixtures is accomplished by hydrosilylation, i.e. by addition of methylhydrosiloxanes (having at least 3 SiH groups in the molecule) to the vinyl group of the polymer, with catalysis by ppm amounts of Pt(0) complexes, the crosslinker and catalyst being in the separate components as supplied. Specific inhibitors, e.g. 1-ethynyl-1-cyclohexanol, prevent premature onset of vulcanization after the components have been mixed, and at room temperature produce a dropping time of approximately 3 days. The conditions can be regulated across a considerable range by the concentration of platinum and of inhibitor.

Increasingly, LSR mixtures are being considered for the production of electrically conductive silicone rubber products, since the addition crosslinking, in contrast to the peroxide vulcanization typical of HTV, is not disrupted by furnace blacks (HTV mixtures operate preferably with acetylene black). Conductive furnace blacks are also easier to incorporate and disperse than graphite or metal powders, with silver being preferred.

The silicone rubber compositions of the invention have the following advantages:

Investigations in LSR (liquid silicone rubber) show surprisingly that the inventive silica of Example 1, in comparison to Aerosils (fumed silicas) with the same or similar surface area and with the same or similar rheological properties on the part of the compounds and mechanical properties on the part of the vulcanizates, exhibit a decidedly high vulcanizate transparency.

With the silicas of the invention it is possible to use materials which on account of their hydrophobicity have low viscosities and yield points, which can be dispersed and incorporated very easily and rapidly, and therefore need not be exposed to high shearing forces in the course of preparation. The silicone rubber compositions of the invention, surprisingly, exhibit improved optical properties in the form of a very high transparency.

EXAMPLES

Preparation of the Inventive Example

A mixer is charged with 2.5 kg of the fumed silica AEROSIL® 300, which has the characteristic data specified in the description, and, with intense mixing, the silica is first sprayed with 0.125 kg of an aqueous potassium chloride solution (which contains 1.58 g KCl) and subsequently with 0.45 kg of hexamethyldisilazane. After spraying has ended, mixing is continued for 15 minutes and is followed by heat treatment for 5 h at 25° C. and subsequently for 2 h at 140° C.

Preparation of the Comparative Silica

A mixer is charged with 2.5 kg of the fumed silica AEROSIL® 300 and, with intense mixing, the silica is first sprayed with 0.125 kg of water and subsequently with 0.45 kg of hexamethyldisilazane. After spraying has ended, mixing is continued for 15 minutes and is followed by heat treatment for 5 h at 25° C. and subsequently for 2 h at 140° C.

TABLE 2

Physicochemical data of the inventive surface-modified silica and the comparative silica

| Designation | Tapped density [g/l] | Loss on drying [%] | Loss on ignition [%] | pH | C content [%] | K content (calculated as $K_2O$) [ppm] | BET specific surface area [$m^2/g$] |
|---|---|---|---|---|---|---|---|
| Comparative silica | 60 | 0.8 | 4.9 | 8.4 | 4.2 | <5 | 204 |
| Inventive silica | 59 | 0.5 | 5.6 | 7.3 | 3.9 | 410 | 194 |

Preparation of the LSR Silicone Rubber Compositions

The inventive silica was tested in LSR silicone rubber compositions according to the following procedure:

In a planetary dissolver, 20% silica is incorporated into organopolysiloxane (Silopren U 10, GE Bayer Silicones) at a slow speed (50/500 $min^{-1}$ planetary mixer/dissolver disc). As soon as the silica is fully wetted, a vacuum of approximately 200 mbar is applied and dispersion is carried out for 30 minutes at 100 rpm of the planetary stirrer and 2000 rpm of the dissolver (cooling with mains water). After cooling, the base mixture can be crosslinked. Following incorporation, the mixture forms a fluid mass of low viscosity. After the thirty-minute dispersing there is somewhat of a reduction in the viscosity. 340 g of the base mixture are weighed out into a stainless steel beaker. Weighed out into the mixture in succession are 6.00 g of inhibitor (2% purity ECH in silicone polymer U 1) and 0.67 g of platinum catalyst solution and 4.19 g of Silopren U 730, and the mixture is homogenized at a speed of n=500 rpm and deaerated.

Vulcanization:

For the vulcanization of the 2 mm vulcanizates, 4*50 g or 2*100 g of the mixture are needed. The plates are then pressed in the press for 10 minutes at a pressure of 100 bar and a temperature of 120° C. For the vulcanization of the 6 mm vulcanizates, 120 g of the mixture are needed. In the press the plates are pressed for 12 minutes at a pressure of 100 bar and a temperature of 120° C. Thereafter the vulcanizates are post-vulcanized in an oven at 200° C. for 4 hours.

TABLE 3

Rheological properties with 20% silica

|  | Yield point [Pa] | Viscosity D = 10 $s^{-1}$ [Pas] |
|---|---|---|
| Comparative Example | 0 | 158 |
| Example 1 | 0 | 152 |

TABLE 4

Mechanical and optical properties of the vulcanizates with 20% silica

| Silica | Tensile strength [$N/mm^2$] | Breaking elongation [%] | Tear propagation resistance [N/mm] | Hardness [Shore A] | Rebound elasticity [%] | Transparency [DE/D65] |
|---|---|---|---|---|---|---|
| Comp. Ex. | 5.6 | 396 | 20 | 43 | 61 | 43 |
| Inv. Ex. | 5.6 | 398 | 19 | 43 | 64 | 49 |

Table 4 summarizes the results of the mechanical and optical testing. The extremely high transparency of the inventive example, which is 14% higher than that of the comparative example, is to be emphasized.

The invention claimed is:
1. A surface-modified, fumed silica, wherein:
the surface modified fumed silica is obtained by spraying a fumed silica with a solution of a potassium compound prior to or during a surface modification reaction; and wherein for the surface-modified fumed silica:
a BET surface area is 25 to 400 m$^2$/g,
an average primary particle size is 5 to 50 nm,
a pH of a 4% aqueous dispersion is from 3 to 10,
a carbon content is 0.1 to 10% by weight, and
a potassium content calculated as potassium oxide, is 0.000001 to 40% by weight.

2. A process for preparing the surface-modified, fumed silica according to claim 1, wherein the surface modification reaction comprises:
treating the fumed silica with at least one surface modifier selected from the group consisting of:
a) organosilanes of formula $(RO)_3Si(C_nH_{2n+1})$ and formula $(RO)_3Si(C_nH_{2n+1})$,
wherein
R is methyl-, ethyl-, n-propyl-, isopropyl- or butyl-, and
n is 1-20;
b) organosilanes of formula $R'_x(RO)_ySi(C_nH_{2n+1})$ and formula $R'_x(RO)_ySi(C_nH_{2n-1})$, wherein
R is methyl-, ethyl-, n-propyl-, isopropyl- or butyl-,
R' is methyl-, ethyl-, n-propyl-, isopropyl-, butyl- or cycloalkyl-,
n is 1-20,
x+y is 3,
x is 1 or 2, and
y is 1 or 2;
c) haloorganosilanes of formula $X_3Si(C_nH_{2n+1})$ and formula $X_3Si(C_nH_{2n-1})$,
wherein
X is Cl or Br, and
n is 1-20;
d) haloorganosilanes of formula $X_2(R')Si(C_nH_{2n+1})$ and formula $X_2(R')Si(C_nH_{2n-1})$,
wherein
X is Cl or Br,
R' is methyl-, ethyl-, n-propyl-, isopropyl-, butyl- or cycloalkyl-, and
n is 1-20;
e) haloorganosilanes of formula $X(R')_2Si(C_nH_{2n+1})$ and formula $X(R)_2Si(C_nH_{2n-1})$,
wherein
X is Cl or Br,
R' is methyl-, ethyl-, n-propyl-, isopropyl-, butyl- or cycloalkyl-, and
n is 1-20;
f) organosilanes of formula $(RO)_3Si(CH_2)_m$—R',
wherein
R is methyl-, ethyl- or propyl-,
m is 0.1-20, and
R' is methyl-, aryl-, —$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—N—($CH_2$—$CH_2$—$NH_2$)$_2$,
—OOC($CH_3$)C=$CH_2$,
—$OCH_2$—CH(O)$CH_2$,
—NH—CO—N—CO—($CH_2$)$_5$,
—NH—COO—$CH_3$, —NH—COO—$CH_2$—$CH_3$,
—NH—($CH_2$)$_3$Si(OR)$_3$,
—$S_x$—($CH_2$)$_3$Si(OR)$_3$,
—SH or
—NR"R'"R"" wherein R" is alkyl or aryl; R'" is H, alkyl or aryl; R"" is H, alkyl, aryl, benzyl, $C_2H_4NR_2$"'" wherein R"'" is, independently, H or alkyl;
g) haloorganosilanes of formula $X_3Si(CH_2)_m$—R',
wherein
X is Cl or Br,
m is 0.1-20, and
R' is methyl-, aryl-, —$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—N—($CH_2$—$CH_2$—$NH_2$)$_2$,
—OOC($CH_3$)C=$CH_2$,
—$OCH_2$—CH(O)$CH_2$,
—NH—CO—N—CO—($CH_2$)$_5$,
—NH—COO—$CH_3$, —NH—COO—$CH_2$—$CH_3$, or
—SH;
h) haloorganosilanes of formula $(R)X_2Si(CH_2)_m$—R',
wherein
X is Cl or Br,
R is methyl-, ethyl- or propyl-,
m is 0.1-20, and
R' is methyl-, aryl-, —$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—N—($CH_2$—$CH_2$—$NH_2$)$_2$,
—OOC($CH_3$)C=$CH_2$,
—$OCH_2$—CH(O)$CH_2$,
—NH—CO—N—CO—($CH_2$)$_5$,
—SH, or
—NH—COO—$CH_3$, —NH—COO—$CH_2$—$CH_3$,
NH—($CH_2$)$_3$Si(OR")$_3$, wherein R" is methyl-, ethyl-, propyl- or butyl-;
i) haloorganosilanes of formula $(R)_2XSi(CH_2)_m$—R',
wherein
X is Cl or Br,
R is alkyl,
m is 0.1-20, and
R' is methyl-, aryl-, —$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—N—($CH_2$—$CH_2$—$NH_2$)$_2$,
—OOC($CH_3$)C=$CH_2$,
—$OCH_2$—CH(O)$CH_2$,
—NH—CO—N—CO—($CH_2$)$_5$,
—SH, or
—NH—COO—$CH_3$, —NH—COO—$CH_2$—$CH_3$,
NH—($CH_2$)$_3$Si(OR")$_3$, wherein R" is methyl-, ethyl-, propyl- or butyl-;
j) cyclic polysiloxanes of formula

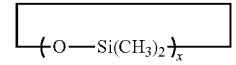

wherein x is 3, 4 or 5;
l) polysiloxanes or silicone oils of formula

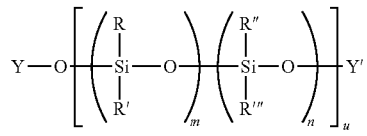

wherein n, m and u are 0 or an integer,

Y is H or a $C_{1-20}$ alkyl,

Y' is $Si(CH_3)_3$, $Si(CH_3)_2H$, $Si(CH_3)_2OH$, $Si(CH_3)_2(OCH_3)$, or $Si(CH_3)_2(C_kH_{2k+1})$, wherein k is 1 to 20, and R, R', R" and R'" independently is $C_kH_{2k+1}$, substituted or unsubstituted aryl, $(CH_2)_k$—$NH_2$, or H.

3. A silicone rubber composition, comprising the surface-modified, fumed silica according to claim 1.

4. A LSR silicone rubber composition, comprising the surface-modified, fumed silica according to claim 1.

5. The process according to claim 2, wherein the at least one surface modifier is selected from the group consisting of octyltrimethoxysilane, octyltriethoxysilane, hexamethyldisilazane, 3-methacryloyloxypropyltrimethoxysilane, 3-methacryloyloxypropyltriethoxysilane, hexadecyltrimethoxysilane, hexadecyltriethoxysilane, dimethylpolysiloxane, glycidyloxypropyltrimethoxysilane, glycidyloxypropyltriethoxysilane, nonafluorohexyltrimethoxysilane, tridecafluorooctyltrimethoxysilane, tridecafluorooctyltriethoxysilane, aminopropyltriethoxysilane and hexamethyldisilazane.

* * * * *